US007199702B2

(12) United States Patent
Lizza

(10) Patent No.: US 7,199,702 B2

(45) Date of Patent: Apr. 3, 2007

(54) WIRELESS PROXIMITY SENSOR READER TRANSMITTER

(75) Inventor: Alfred M. Lizza, Oyster Bay, NY (US)

(73) Assignee: Honeywell International, Inc, Morristown, NJ (US)

( * ) Notice: Subject to any disclaimer, the term of this patent is extended or adjusted under 35 U.S.C. 154(b) by 183 days.

(21) Appl. No.: 10/871,387

(22) Filed: Jun. 17, 2004

(65) Prior Publication Data

US 2005/0280530 A1 Dec. 22, 2005

(51) Int. Cl.

| | |
|---|---|
| ***B60R 25/00*** | (2006.01) |
| ***B60R 25/10*** | (2006.01) |
| ***H01H 47/22*** | (2006.01) |
| ***G08B 1/08*** | (2006.01) |
| ***H04Q 7/00*** | (2006.01) |

(52) U.S. Cl. .......................... 340/426.18; 340/539.23; 307/10.2

(58) Field of Classification Search ........... 340/539.23, 340/426.1, 426.36, 426.13–426.17; 116/33; 307/10.2

See application file for complete search history.

(56) References Cited

U.S. PATENT DOCUMENTS 5,309,144 A * 5/1994 Lacombe et al. ...... 340/539.23
5,723,911 A * 3/1998 Glehr ........................ 340/10.5
6,028,513 A * 2/2000 Addy .................... 340/539.16
6,429,768 B1 * 8/2002 Flick .......................... 340/5.2
6,677,851 B1 * 1/2004 Losey ....................... 340/5.62
6,980,086 B2 * 12/2005 Papp ......................... 340/10.4

* cited by examiner

*Primary Examiner*—Daniel Wu
*Assistant Examiner*—Jennifer Mehmood
(74) *Attorney, Agent, or Firm*—John Beninati; Robert S. Smith

(57) ABSTRACT

A wireless security system includes a control panel, a radio frequency receiver hardwired to the control panel, a plurality of wireless sensors having a standardized data output for communicating with the radio frequency receiver as well as a proximity reader. The apparatus also includes a transmitter hardwired to the proximity reader and the transmitter is configured to communicate with the receiver. The apparatus also includes a proximity device configured to cooperate with the proximity reader. A common communications protocol is utilized by both the proximity device and the wireless sensors. The invention also includes the method for controlling a security system which includes using a common communications protocol to communicate with both the proximity reader and the wireless sensors.

4 Claims, 1 Drawing Sheet

FIG. 1
PRIOR ART
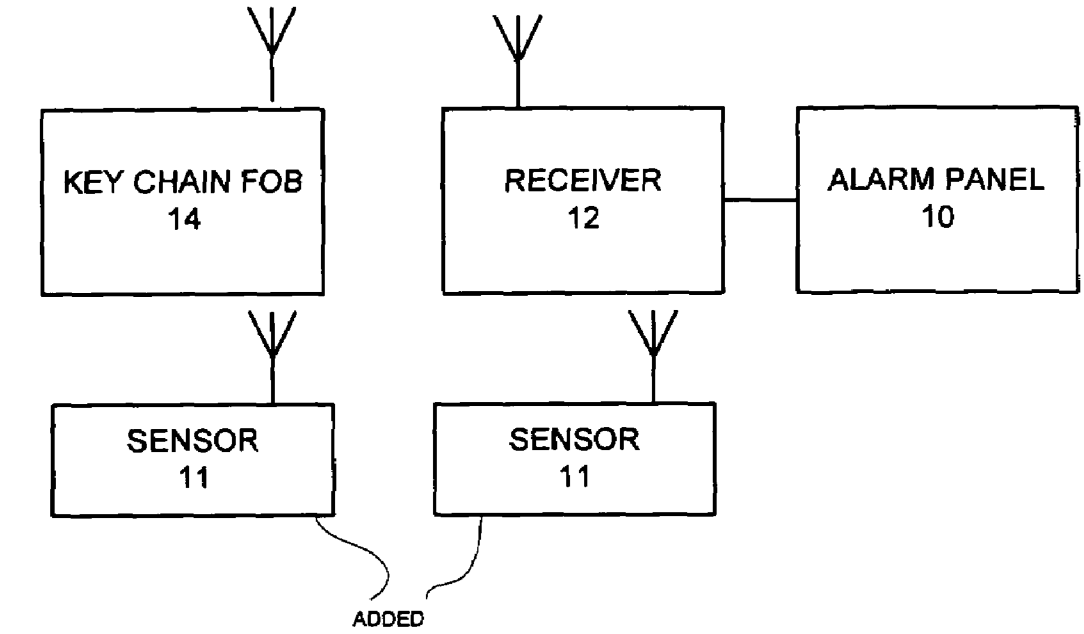
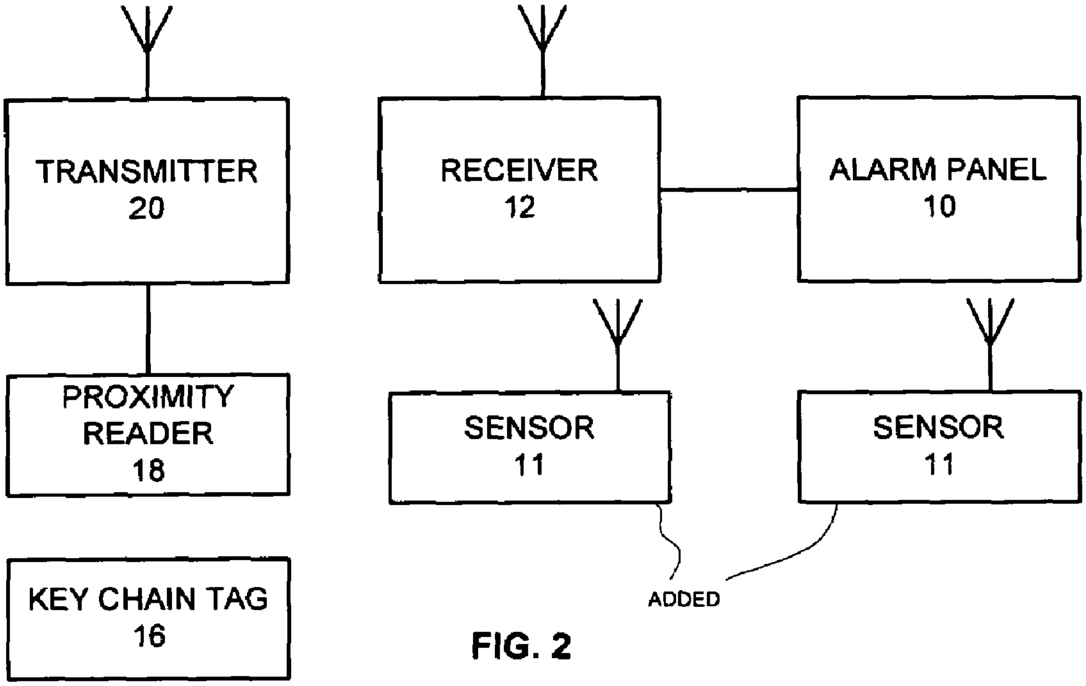
FIG. 2

WIRELESS PROXIMITY SENSOR READER TRANSMITTER

BACKGROUND OF THE INVENTION

The invention relates to security systems and particularly to wireless systems that allow the user to remotely control a security system.

Conventional wireless security systems are typically operated by wireless key chain fobs and wireless key pads. While such controls are satisfactory for many applications, they require the user, at least in some cases, to remember a code or operate a particular button when the user may be carrying packages or operating a motor vehicle. Imprecise commands by a user may result in false alarms. The requirement to carry a specific wireless key chain fob may be annoying to a user who already has a key chain fob for a vehicle security system on the user's key chain.

SUMMARY OF THE INVENTION

It is an object of present invention to make the security system simpler and easier to use.

Another object invention is to reduce false alarms by simplifying the user interface for a security system without adding additional labor cost to the security system installation companies.

Still another object invention is to eliminate the need for a security system user to remember a numeric code.

Yet another object of the invention is to eliminate the need for an end-user to carry a security system wireless key fob and thus eliminate the bulk thereof which is particularly offensive to a user who may already have a motor vehicle alarm system fob on his or her key chain.

It has now been found that these and other objects of the invention may be attained in a wireless security system which includes a control panel, a radio frequency receiver hardwired to the control panel, a plurality of wireless sensors having a standardized data output for communicating with the radio frequency receiver as well as a proximity reader. The apparatus also includes a transmitter hardwired to the proximity reader and the transmitter is configured to communicate with the receiver. The apparatus also includes a proximity device configured to cooperate with the proximity reader, the proximity device utilizes a communication protocol to cause the transmitter to transmit data formatted in a manner consistent with the format of the data produced by the plurality of wireless sensors.

In some cases the wireless security system includes a proximity device causes the transmitter to include site identification, a unique serial number, transmit data utilizing the Ademco 5800 data format/communications protocol or transmit data utilizing another data format/communications protocol, transmit data that causes the security system to arm and/or causes the security system to disarm.

In other cases the invention provides a device for use in a wireless security system that a control panel, a radio frequency receiver hardwired to the control panel, and a plurality of wireless sensors having a standardized data output for communicating with the radio frequency receiver. The device includes a proximity reader, a transmitter hardwired to the proximity reader that is configured to communicate with the receiver. The proximity device is configured to cooperate with the proximity reader and the proximity device has data formatted thereon in a manner to cause the transmitter to transmit data formatted in a manner consistent with the format of the data produced by the plurality of wireless sensors.

In some cases the transmitter transmits site identification, and a unique serial number utilizing the Ademco 5800 data format/communications protocol or other communications protocol that causes the security system to arm and/or data that causes the security system to disarm.

The invention also includes the method for controlling a security system which comprises providing a control panel, providing a radio frequency receiver that is hardwired to the control panel, providing a plurality of wireless sensors having a standardized data output for communicating with the radio frequency receiver, providing a proximity reader, providing a transmitter hardwired to the proximity reader and configured to communicate when the receiver, and providing a proximity device configured to cooperate with the proximity reader that has data formatted in a manner to cause the transmitter to transmit data formatted in a manner consistent with the format of the data produced by the plurality of wireless sensors.

In other cases the method includes the step of providing a proximity device includes providing a proximity device that causes the transmitter to include site identification and a unique serial number, to transmit data utilizing the Ademco 5800 data format/communications protocol or to transmit data utilizing another data format/communications protocol to cause the security system to arm and/or disarm.

BRIEF DESCRIPTION OF THE DRAWING

The invention will be better understood by reference the accompanying drawing in which:

FIG. 1 is a schematic of a prior art security panel hardwired to a receiver that communicates with a fob.

FIG. 2 is a schematic view of the apparatus and method in accordance one form of present invention in which a key chain tag is positioned adjacent to approximately reader hardwired to a transmitter that communicates with a receiver connected to a security panel.

DESCRIPTION OF THE PREFERRED EMBODIMENTS

There is a variety of central station systems intended for homeowners, business owners, and other potential targets for burglary, that are monitored by a central station. These systems are vastly superior to older systems that merely sound a bell or alarm. They have also largely replaced systems that were tied in directly to the local police station. As the use of burglar alarms increased, the local police departments began turning down more and more requests to be "hooked-up." As a result, there became a demand for central stations, or companies whose specialty it was to simply monitor burglar alarms. Most police departments will still allow banks and large jewelry stores a direct link to the police station, but as a rule, homeowners are excluded. So as the demand for security has risen, many guard agencies and burglar alarm installers have begun to offer centralized monitoring as an option for their clients.

When such systems are installed, it is common for them to be connected by a dedicated telephone line to the central station. Other systems utilize radio frequency and the internet to connect to the central station. In event of an intrusion, the control panel on the premises being monitored calls up to the central station. In the event of an intrusion, the control panel (also know as a security panel) on the premises being monitored calls up the central station and gives an electronic message to the answering computer. It tells the computer exactly which switch or sensor has been violated, and the computer then tells the operator what has happened. For example, if a burglar enetered through a broken window, the alarm panel would deliver data to the central-station to indicate that in the particular protected premise zone 4, a first floor window, has been broken. As the thief progresses through the house, the alarm panel would notify the central-station as each sensor is violated. The operator at the central-station may then receive data indicating that zone 17, a passive Infrared dector in the master bedroom, has detected someone. In some case preamplified microphones allow audio monitoring of the protected premises. The operator would then be fairly sure someone was in the house, so the operator would have three options. The operator may just send the companies guards to the scene, call 911 and dispatch the police, or he may send both the police and the guards.

The present invention has particular application to wireless security systems that are often used with a central station system. A general understanding of known wireless security systems and known proximity readers will aid in understanding of present invention.

The prior art includes various radio frequency (RF) wireless security systems. The present invention will be better understood by reference to the following United States patents, having the same assignee as the present application, which are incorporated by reference herein:

U.S. Pat. No. 6,167,137 Secure communications in a wireless system

U.S. Pat. No. 6,026,165 Secure communications in a wireless system

In typical systems a central receiver, controller, central transmitter, dialer and siren are interconnected to each other by conventional (i.e., wired) means. The central control unit performs bidirectional wireless communication with the alarm devices using, for instance, signals within a Radio Frequency Band (which is essentially defined in accordance with FCC Part 15 as any frequency provided substantially no interference is created and the system is prepared to accept interference from other sources) or a Citizen's Band (typically from approximately 25 MHz to 28 MHz). Currently, typical Radio frequency ranges used are 300 to 400 MHz and 902 to 928 MHz; however, these are merely intended to provide an example and not a limitation on the application of the present invention in any way. For example, the ADEMCO 5800 system, manufactured by Honeywell, 165 Eileen Way, Syosset, N.Y. 11791, uses frequencies of approximately 345 MHz. In the preferred embodiment the alarm signal, transmitted by the initiating alarm device in response to the alarm condition, is substantially within the Radio Frequency Band allocated to devices intended to operate in accordance with FCC Part 15 while the broadcast signal, transmitted by the central transmitter, is substantially within the Citizen's Band. However, the alarm signal and the broadcast signal could occupy the same band. For instance, both the alarm signal and the broadcast signal could occupy the Radio Frequency Band in accordance with FCC Part 15 or both could occupy the Citizens Band. Alternatively, the alarm signal could occupy the Radio Frequency Band in accordance with FCC Part 15 and the broadcast signal could occupy the Citizen's Band.

Most radio frequency (RF) wireless security systems available today, such as those manufactured by HONEYWELL and identified with the ADEMCO trademark, generally employ a multiplicity of transmitter products which transmit information to a common receiver/controller. The information transmitted typically describes the state of various transducers associated with each transmitter, such as smoke, motion, breaking glass, shock and vibration detectors; door, window and floor mat switches, etc. Each signal has a unique identification code embedded in its data message, which serves to identify to the system controller which particular transmitting device has sent that message. Stated another way, each signal has a standardized format. The ADEMCO 5800 has a standardized format. Other systems will have some other standardized formats. The receiver in any given system will only recognize inputs in the standardized format of that system.

Wireless security systems operating in residential and commercial buildings are often relied upon for safety of life applications. Many national regulatory agencies place stringent requirements on the operation of these types of systems. In the USA, Underwriter's Laboratories issues specifications, in the UK, British Standards apply, and in most of Europe, CENELEC harmonized norms set the specifications. In particular, it is becoming more common for these specifications to require that the received signal strengths from all sensor transmitters should be recorded at the time of installation such that at a later time of a periodic building inspection, an inspector can compare received signal strengths with those which were recorded at the time of original installation and relocate transmitters if necessary. In this set up, the inspector is relied upon for determining if there is a signal below margin. This may impose human error. Also in an environment where there are many changes, the inspector may not monitor the signal at a time when the signal is below margin.

Proximity sensors are known in the art. One manufacturer is Rockwell Automation Corporate Headquarters; US Bank Center; 777 East Wisconsin Avenue; Suite 1400; Milwaukee, Wis. 53202 USA. That company manufacturers Allen-Bradley proximity sensors. The most commonly-used proximity sensor is the inductive type, which generates an electromagnetic field to sense metal objects passing close to its face. This is usually the easiest sensing technology to apply in applications where the metal object to be detected is within an inch or two of the sensor face. Various forms are provided for a range of applications including packaging applications, automotive welding equipment as well as food processing plants.

Inductive proximity sensors are designed to operate by generating an electromagnetic field and detecting the eddy current losses generated when ferrous and nonferrous metal target objects enter the field. The sensor consists of a coil on a ferrite core, an oscillator, a trigger-signal level detector and an output circuit. As a metal object advances into the field, eddy currents are induced in the target. The result is a loss of energy and smaller amplitude of oscillation. The detector circuit then recognizes a specific change in amplitude and generates a signal which will turn the solid-state output "ON" or "OFF."

A metal target approaching an inductive proximity sensor absorbs energy generated by the oscillator. When the target is in close range, the energy drain stops the oscillator and changes the output state.

The active face of an inductive proximity switch is the surface where a high-frequency electromagnetic field emerges. A standard target is a mild steel square, 1 mm thick, with side lengths equal to the diameter of the active face or 3× the nominal switching distance, whichever is greater.

To determine the sensing distance for materials other than the standard mild steel, a correction factor is used. The composition of the target has a large effect on sensing distance of inductive proximity sensors. If a target constructed from one of the materials listed is used, multiply the nominal sensing distance by the correction factor listed in order to determine the nominal sensing distance for that target. Note that ferrous-selective sensors will not detect brass, aluminum or copper, while nonferrous selective sensors will not detect steel or ferrous-type stainless steels.

The correction factors listed below can be used as a general guideline. Common materials and their specific correction factors are listed on each product specification page. (Nominal Sensing Range)×(Correction Factor)=Sensing Range.

The size and shape of the target may also affect the sensing distance. The following are general guideline when correcting for the size and shape of a target:

1. Flat targets are preferable
2. Rounded targets may reduce the sensing distance
3. Nonferrous materials usually reduce the sensing distance for all-metal sensing models
4. Targets smaller than the sensing face typically reduce the sensing distance
5. Targets larger than the sensing face may increase the sensing distance
6. Foils may increase the sensing distance The difference between the operate point and the release point is called hysteresis or differential travel. The amount of target travel required for release after operation must be accounted for when selecting target and sensor locations. Hysteresis is needed to help prevent chattering (turning on and off rapidly) when the sensor is subjected to shock and vibration or when the target is stationary at the nominal sensing distance. Vibration amplitudes must be smaller than the hysteresis band to avoid chatter.

Referring now to FIG. 1 is a schematic of a prior art security or alarm panel 10 that controls a security system. The panel 10 is hardwired to a receiver 12 that communicates with a key chain fob 14. The system includes multiple sensors 11, 11 that communicate with the receiver 12. Typically the receiver 12 is a radio frequency device, although other communications methods may be used. By depressing a button on the key chain fob 14 a signal is transmitted to the receiver. This signal may arm or disarm the security system controlled by the security panel 10. If the system is utilizing, for example, the ADEMCO 5800 system this signal will conform to the data format/communications protocol and standards of that system. If the system is utilizing, for example, some other system this signal will conform to the data format/communications protocol standards of that system.

A preferred embodiment of the present invention utilizes devices manufactured and sold by Honeywell and sometimes identified by the designation Ademco wireless radio frequency 5800 series devices. All of the equipment in the 5800 series utilizes a common data format/communications protocol. This common data format/communications protocol is necessary for communication between the respective items in the series. The series includes a four button transmitter, a four button wireless key, a smoke detector, an ultra-small transmitter, a low-temperature transmitter, a recessed or transmitter, a keypad, a bidirectional keypad, a passive infrared detector, a panic pendant, a smoke detector, a mini two-point transmitter, a three-point transmitter, a shock processor and transmitter, a dual technology detector, a wireless watch transmitter, a wireless siren, a heat detector transmitter, a temperature transmitter, a shock processor transmitter, etc. the wide variety of such modules with a common data format/communications protocol is advantageous.

The prior art includes various radio frequency (RF) wireless security systems. Each of the following United States patents incorporated herein by reference describes systems that include illustrative examples utilizing ADEMCO 5800 receivers, transmitters, and standardized data format/communications protocol:

U.S. Pat. No. 6,445,291 Adaptive console for augmenting wireless capability in security systems U.S. Pat. No. 6,243,010 Adaptive console for augmenting wireless capability in security systems U.S. Pat. No. 6,150,936 Method and system for analyzing received signal strength U.S. Pat. No. 6,028,513 Wireless activation of multiple alarm devices upon triggering of a single device This series of devices also includes site identification and the common data format/communications protocol. It is not a central to the invention to include site identification and the common data. In other words the method and apparatus of the present invention will have utility even in a system that does not include site identification. The inclusion of this site identification, however, insures that the communication between devices is limited to the devices within only a common system. Because the range of such radio frequency devices, used for such applications, ordinarily will be as great as one-mile, it is very desirable that this site identification be included to ensure that the communication is limited to only the devices within a single system.

FIG. 2 is a schematic view of the apparatus and method in accordance one form of present invention in which a key chain tag 16 is positioned adjacent to a proximity reader 18 hardwired to a transmitter 20 that communicates with a receiver 12 connected to a security or alarm panel 10. The system includes multiple sensors 11, 11 that communicate with the receiver 12.

The apparatus and method in accordance with present invention integrates a proximity reader 18 into a small wireless transmitter 20. The user is provided with a key chain tag 16 that is coded to provide in combination with the proximity reader and the small wireless transmitter an output that is the specific data string in the specific format required to to initiate an action in the panel. This specific requirement means that no changes are required in the receiver 12 and the panel 10 to achieve the same functionality that was achieved with the prior art apparatus.

In the case of the system utilizing the ADEMCO 5800 standard, the transmitter 20 when activated will transmit the unique 5800 serial number of the proximity device or key chain tag 16 to the receiver 12 and the security control panel 10. This unique serial number is in the same format as Ademco wireless transmitter devices. This information sent to the control will be used by the control to identify the user and take the appropriate programmed action, in the same manner as achieved with known ADEMCO 5800 wireless keys and security sensor transmitters.

The proximity reader 18 and transmitter 20 may be installed in a convenient location on the protected premises. The user will carry a small proximity device or key chain tag 16 that will take up very little room on his or her key chain. The proximity device 16 may be a card, key chain tag, or other object. The user, for example, can easily disarm the security system by placing the proximity device key chain tag 16 next to the proximity reader 18. The proximity reader 18 is preferably compactly constructed with the transmitter 20. The user will not need to remember or enter a code into a keypad. The transmitter 20 will send the user information (from the proximity reader 18) to the control in the security panel 10. The control will then take the appropriate action. In addition a user need only place the key tag next to the proximity reader 18 when leaving the protected premises to arm the security system. A user can then perform any operation supported by a security system without entering a code, eliminating the need for a numeric keypad or wireless key fob.

In some embodiments the proximity reader is programable whereby multiple proximity events are differentially construed. For the sake of convenience of description the moement of the proximity device 16 near to the proximity reader 18 will be defined as a swipe. Thus, one swipe in a predetermined time period will be programmed to produce a given output W, two swipes in a predetermined time period will be programmed to produce a given output X, three swipes in a predetermined time period will be programmed to produce a given output Y, and four swipes in a predetermined time period will be programmed to produce a given output Z. In other embodiments the outpts W, X, Y, and Z may be achieved by a proximity device that is actually a composite device that includes four different proximty devices, such as a card having four discrete proximity devices located within it (such as on the respective four sides of the card. The description herein has referred to toggling of a device such as arming and disarming a proximity device. It will be understood multiple swipes and composite proximity devices particularly with a programmable proximity reader will enable the user to achieve a more robust control of a security system.

Although the description above contains much specificity, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless security system which comprises:

a control panel;

a radio frequency receiver hardwired to said control panel;

a proximity reader;

a transmitter hardwired to said proximity reader, said transmitter being configured to communicate with said receiver;

a proximity device configured to cooperate with said proximity reader, said proximity device causing said transmitter to transmit data, said proximity reader being programmable whereby sets respectively of n and n+1 repetitive movements of a single proximity device proximate to said proximity reader within a predetermined time produce respective first and second outputs.

2. A wireless security system which comprises:

a control panel;

a radio frequency receiver hardwired to said control panel;

a proximity reader;

a transmitter hardwired to said proximity reader, said transmitter being configured to communicate with said receiver;

a proximity device configured to cooperate with said proximity reader, said proximity device causing said transmitter to transmit data, said proximity reader being programmable to respond to the number of repetitive movements of a single proximity device proximate to said proximity reader within a predetermined time to produce respective outputs.

3. A method for controlling a security system which comprises:

providing a control panel;

providing a radio frequency receiver that is hardwired to the control panel;

providing a plurality of wireless sensors communicating with the radio frequency receiver and having a data output conforming to a first communications protocol;

providing a proximity reader;

providing a transmitter hardwired to the proximity reader and configured to communicate with the receiver; and providing a proximity device configured to cooperate with the proximity reader and communicating with said receiver with data formatted to conform to the first communications protocol, the step of providing a proximity reader includes providing a proximity reader that is programmable to produce respective outputs corresponding to the number of repetitive movements of a single proximity device proximate to said proximity reader within a predetermined time.

4. A method for controlling a security system which comprises:

providing a control panel;

providing a radio frequency receiver that is hardwired to the control panel;

providing a plurality of wireless sensors communicating with the radio frequency receiver and having a data output conforming to a first communications protocol;

providing a proximity reader;

providing a transmitter hardwired to the proximity reader and configured to communicate with the receiver; and providing a proximity device configured to cooperate with the proximity reader and communicating with said receiver with data formatted to conform to the first communications protocol, the step of providing a proximity reader includes providing a proximity reader that is programmable whereby sets respectively of n and n+1 repetitive movements of a single proximity device proximate to said proximity reader within a predetermined time produce respective first and second outputs.

* * * * *